(12) United States Patent
Johri et al.

(10) Patent No.: US 10,471,951 B2
(45) Date of Patent: Nov. 12, 2019

(54) HYBRID VEHICLE POWERTRAIN CONTROL DURING LOSS OF MOTOR SPEED FEEDBACK

(71) Applicant: FORD GLOBAL TECHNOLOGIES, LLC, Dearborn, MI (US)

(72) Inventors: Rajit Johri, Canton, MI (US); Fazal Urrahman Syed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2 days.

(21) Appl. No.: 15/672,588

(22) Filed: Aug. 9, 2017

(65) Prior Publication Data

US 2019/0047549 A1 Feb. 14, 2019

(51) Int. Cl.
*B60W 20/40* (2016.01)
*B60W 20/30* (2016.01)
*B60W 20/50* (2016.01)
*B60K 6/22* (2007.10)
*B60K 6/38* (2007.10)
*B60K 6/387* (2007.10)
*B60W 50/029* (2012.01)
*B60W 10/02* (2006.01)
*B60W 10/11* (2012.01)
*B60K 6/48* (2007.10)
*B60W 50/02* (2012.01)

(52) U.S. Cl.
CPC ............... *B60W 20/50* (2013.01); *B60K 6/22* (2013.01); *B60K 6/38* (2013.01); *B60K 6/387* (2013.01); *B60W 10/02* (2013.01); *B60W 10/026* (2013.01); *B60W 10/11* (2013.01); *B60W 20/30* (2013.01); *B60W 50/029* (2013.01); *B60K 2006/4825* (2013.01); *B60W 2050/0215* (2013.01); *B60W 2510/0283* (2013.01); *B60W 2510/083* (2013.01); *B60W 2510/1015* (2013.01); *B60W 2520/10* (2013.01); *B60W 2520/28* (2013.01)

(58) Field of Classification Search
CPC ....... B60W 20/40; B60W 20/30; B60W 20/50
See application file for complete search history.

(56) References Cited

U.S. PATENT DOCUMENTS

| | | | | |
|---|---|---|---|---|
| 5,697,466 | A | * 12/1997 | Moroto | ........... B60K 6/365 180/65.25 |
| 5,789,823 | A | * 8/1998 | Sherman | ........... B60K 6/26 180/65.25 |
| 8,326,475 | B2 | 12/2012 | Yoshida et al. | |
| 9,358,974 | B2 | 6/2016 | Doering et al. | |

(Continued)

*Primary Examiner* — Bickey Dhakal
*Assistant Examiner* — Cortez M Cook
(74) *Attorney, Agent, or Firm* — David Kelley; Brooks Kushman P.C.

(57) ABSTRACT

Propulsion for a vehicle is provided by a hybrid powertrain that includes a torque converter coupled to an electric machine and selectively coupled to an engine. The hybrid powertrain further includes a controller programmed to, responsive to a loss of speed feedback of the electric machine while the engine is disconnected from the torque converter and the torque converter is open, operate one or more of a gearbox, the electric machine, and the engine based on an impeller speed of the torque converter derived from a torque of the electric machine and a speed of the vehicle.

20 Claims, 2 Drawing Sheets

(56) References Cited

U.S. PATENT DOCUMENTS

| | | | |
|---|---|---|---|
| 2002/0058565 A1* | 5/2002 | Yamamoto | B60K 6/48 |
| | | | 477/5 |
| 2013/0296121 A1* | 11/2013 | Gibson | F02D 41/022 |
| | | | 477/5 |
| 2013/0297161 A1* | 11/2013 | Gibson | B60W 20/00 |
| | | | 701/54 |
| 2013/0297162 A1* | 11/2013 | Dai | B60W 20/30 |
| | | | 701/55 |
| 2015/0175151 A1 | 6/2015 | Schmoll Genannt Eisenwerth et al. | |
| 2015/0198243 A1* | 7/2015 | Johri | B60W 10/023 |
| | | | 701/22 |
| 2016/0017933 A1* | 1/2016 | Nedorezov | F16D 33/18 |
| | | | 701/68 |
| 2016/0031431 A1* | 2/2016 | Johri | B60W 10/026 |
| | | | 477/5 |
| 2016/0281845 A1 | 9/2016 | Pietron et al. | |

\* cited by examiner

HYBRID VEHICLE POWERTRAIN CONTROL DURING LOSS OF MOTOR SPEED FEEDBACK

TECHNICAL FIELD

This application generally relates to operating a hybrid powertrain during a loss of speed feedback of an electric machine.

BACKGROUND

A hybrid vehicle includes a transmission having different gear ratios that may be selected during a drive cycle. The vehicle may further include a torque converter coupled between the power-producing elements and the transmission. Operation of the vehicle powertrain may use various speed and torque signals. For example, sensors may provide rotational speed values for the power-producing elements. The speed sensor signals may be used for controlling the powertrain. In the event of an unavailability or loss of any of the signals, the vehicle powertrain may be disabled.

SUMMARY

A hybrid powertrain includes a torque converter coupled to an electric machine and selectively coupled to an engine. The hybrid powertrain further includes a controller programmed to, responsive to a loss of electric machine speed feedback while the engine is decoupled and the torque converter is open, shift the gearbox based on an impeller speed of the torque converter derived from a torque of the electric machine and a turbine speed of the torque converter.

The controller may be further programmed to, responsive to a presence of electric machine speed feedback, shift the gearbox based on the impeller speed derived from the electric machine speed feedback. The controller may be further programmed to, the loss of electric machine speed feedback while the engine is decoupled and the torque converter is locked, operate the electric machine and the gearbox based on the impeller speed derived from a wheel speed. The controller may be further programmed to, responsive to the loss of electric machine speed feedback while the engine is coupled, operate the engine, electric machine, and gearbox based on the impeller speed derived from a speed of the engine.

The turbine speed may be derived from a vehicle speed associated with the gearbox. The controller may be further programmed to estimate a state of the torque converter based on the impeller speed. The controller may be further programmed to operate the hybrid powertrain to control vehicle speed on the impeller speed.

A vehicle includes a torque converter coupled to an electric machine and selectively coupled to an engine. The vehicle further includes a controller programmed to, responsive to the engine being disconnected from the torque converter and a loss of electric machine speed feedback, operate the electric machine based on an impeller speed of the torque converter derived from a torque of the electric machine and a speed of the vehicle.

The vehicle may further include a gearbox coupled to an output of the torque converter and the controller may be further programmed to operate the gearbox to shift gears based on the impeller speed.

The controller may be further programmed to, responsive to the loss of electric machine speed feedback while the engine is decoupled and the torque converter is locked, operate the engine and the electric machine based on the impeller speed derived from a wheel speed. The controller may be further programmed to, responsive to the loss of electric machine speed feedback while the engine is coupled, operate the engine and the electric machine based on the impeller speed derived from the speed of the engine. The speed of the vehicle may be derived from at least one wheel speed of the vehicle. The controller may be further programmed to estimate a state of the torque converter based on the impeller speed. The controller may be further programmed to operate the engine and the electric machine to control a creep speed of the vehicle based on the impeller speed.

A method includes shifting a gearbox, coupled to an output of a torque converter that is further coupled to an electric machine and selectively coupled to an engine, based on an impeller speed of the torque converter derived from a torque of the electric machine and a turbine speed of the torque converter responsive to the engine being disconnected from the torque converter and a loss of electric machine speed feedback.

The method may further include shifting the gearbox based on the impeller speed derived from the electric machine speed feedback responsive to a presence of the electric machine speed feedback. The method may further include operating the engine, electric machine and gearbox based on the impeller speed derived from a speed of the engine responsive to the loss of electric machine speed feedback while the engine is coupled. The method may further include operating the engine, electric machine and gearbox based on the impeller speed derived from a wheel speed responsive to the loss of electric machine speed feedback while the engine is decoupled and the torque converter is locked. The method may further include operating the engine, electric machine and gearbox to control a speed output of the gearbox based on the impeller speed. The turbine speed may be derived from a vehicle speed associated with the hybrid powertrain.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
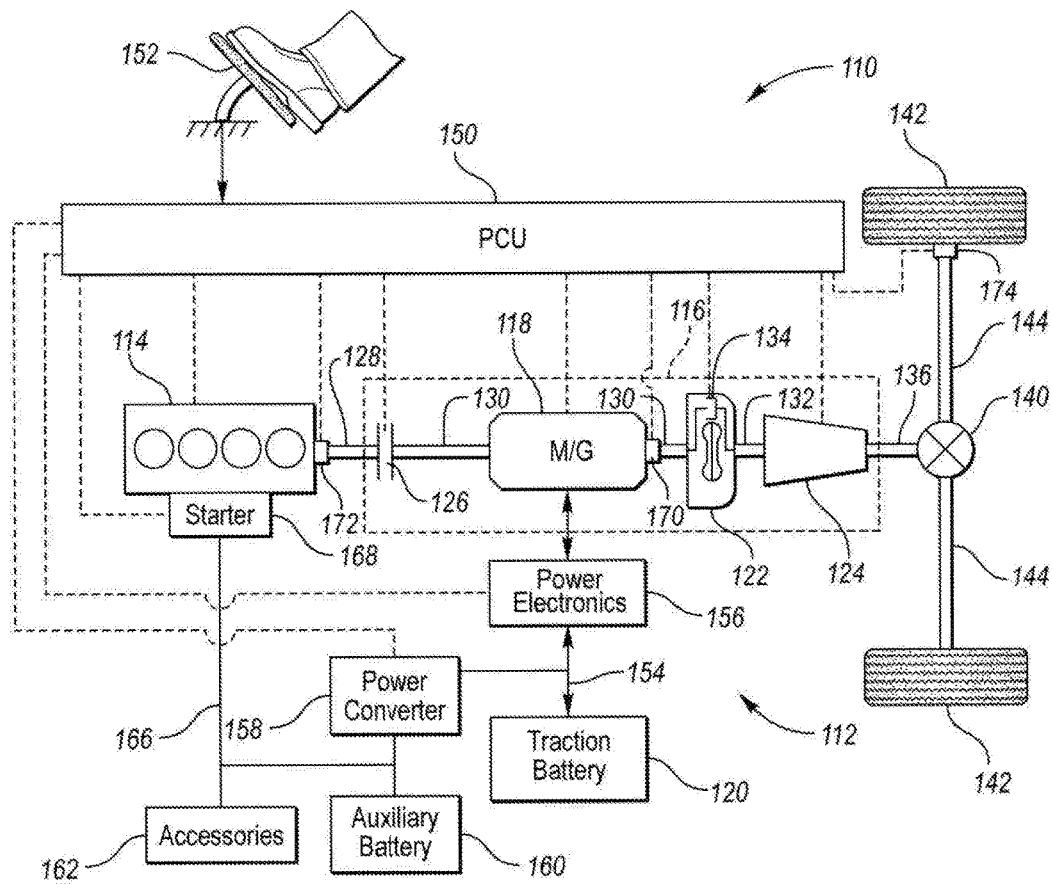
FIG. 1 is a block diagram of a vehicle with a hybrid powertrain.

Referring to FIG. 1, a schematic diagram of a hybrid electric vehicle (HEV) 110 is illustrated according to an embodiment of the present disclosure. FIG. 1 illustrates representative relationships among the components. Physical placement and orientation of the components within the vehicle may vary. The HEV 110 includes a powertrain 112. The powertrain 112 includes an engine 114 that drives a transmission 116, which may be referred to as a modular hybrid transmission (MHT). As will be described in further detail below, transmission 116 includes an electric machine such as an electric motor/generator (M/G) 118, an associated traction battery 120, a torque converter 122, and a multiple step-ratio automatic transmission, or gearbox 124.

The engine 114 and the M/G 118 are both drive sources for the HEV 110. The engine 114 generally represents a power source that may include an internal combustion engine such as a gasoline, diesel, or natural gas powered engine, or a fuel cell. The engine 114 generates an engine power and corresponding engine torque that is supplied to the M/G 118 when a disconnect clutch 126 between the engine 114 and the M/G 118 is at least partially engaged. The M/G 118 may be implemented by any one of a plurality of types of electric machines. For example, M/G 118 may be a permanent magnet synchronous motor. Power electronics 156 condition direct current (DC) power provided by the traction battery 120 to the requirements of the M/G 118, as will be described below. For example, power electronics may provide three phase alternating current (AC) to the M/G 118.

When the disconnect clutch 126 is at least partially engaged, power flow from the engine 114 to the M/G 118 or from the M/G 118 to the engine 114 is possible. For example, the disconnect clutch 126 may be engaged and M/G 118 may operate as a generator to convert rotational energy provided by a crankshaft 128 and M/G shaft 130 into electrical energy to be stored in the traction battery 120. The disconnect clutch 126 can also be disengaged to isolate the engine 114 from the remainder of the powertrain 112 such that the M/G 118 can act as the sole drive source for the HEV 110. The M/G shaft 130 extends through the M/G 118. The M/G 118 is continuously drivably connected to the M/G shaft 130, whereas the engine 114 is drivably connected to the M/G shaft 130 only when the disconnect clutch 126 is at least partially engaged.

The M/G 118 is connected to the torque converter 122 via M/G shaft 130. The torque converter 122 is therefore connected to the engine 114 when the disconnect clutch 126 is at least partially engaged. The torque converter 122 includes an impeller fixed to M/G shaft 130 and a turbine fixed to a transmission input shaft 132. The torque converter 122 thus provides a hydraulic coupling between shaft 130 and transmission input shaft 132. The torque converter 122 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 134 may also be provided that, when engaged, frictionally or mechanically couples the impeller and the turbine of the torque converter 122, permitting more efficient power transfer. The torque converter bypass clutch 134 may be operated as a launch clutch to provide smooth vehicle launch. Alternatively, or in combination, a launch clutch similar to disconnect clutch 126 may be provided between the M/G 118 and gearbox 124 for applications that do not include a torque converter 122 or a torque converter bypass clutch 134. In some applications, disconnect clutch 126 is generally referred to as an upstream clutch and launch clutch 134 (which may be a torque converter bypass clutch) is generally referred to as a downstream clutch.

The gearbox 124 may include gear sets (not shown) that are selectively placed in different gear ratios by selective engagement of friction elements such as clutches and brakes (not shown) to establish the desired multiple discrete or step drive ratios. The gearbox 124 may provide a predetermined number of gear ratios that may range from a low gear (e.g., first gear) to a highest gear (e.g., Nth gear). An upshift of the gearbox 124 is a transition to a higher gear. A downshift of the gearbox 124 is a transition to a lower gear. The friction elements may be controlled according to a shift schedule that sequences connecting and disconnecting certain elements of the gear sets to control the ratio between a transmission output shaft 136 and the transmission input shaft 132. The gearbox 124 is automatically shifted from one ratio to another based on various vehicle and ambient operating conditions by an associated controller 150, such as a powertrain control unit (PCU). The gearbox 124 then provides powertrain output torque to output shaft 136.

It should be understood that the hydraulically controlled gearbox 124 used with a torque converter 122 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 124 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 136 is connected to a differential 140. The differential 140 drives a pair of wheels 142 via respective axles 144 connected to the differential 140. The differential 140 transmits approximately equal torque to each wheel 142 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 112 may further include an associated powertrain control unit (PCU) 150. While illustrated as one controller, the PCU may be part of a larger control system and may be controlled by various other controllers throughout the vehicle 110, such as a vehicle system controller (VSC). It should therefore be understood that the powertrain control unit 150 and one or more other controllers can collectively be referred to as a "controller" that controls various actuators in response to signals from various sensors to control functions such as starting/stopping engine 114, operating M/G 118 to provide wheel torque or charge the traction battery 120, select or schedule transmission shifts, etc. Controller 150 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 150 communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the controller (PCU) 150 may communicate signals to and/or from engine 114, disconnect clutch 126, M/G 118, launch clutch 134, transmission gearbox 124, and power electronics 156. Although not explicitly illustrated, those of ordinary skill in the art will recognize various functions or components that may be controlled by the controller (PCU) 150 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 126, launch clutch 134, and transmission gearbox 124, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 134 status (TCC), deceleration or shift mode (MDE), for example.

Control logic or functions performed by the controller (PCU) 150 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as the PCU 150. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 152 is used by the driver of the vehicle to provide a demanded torque, power, or drive command to propel the vehicle 110. In general, depressing and releasing the accelerator pedal 152 generates an accelerator pedal position signal that may be interpreted by the controller 150 as a demand for increased power or decreased power, respectively. Based at least upon input from the pedal, the controller 150 commands torque from the engine 114 and/or the M/G 118. The controller 150 also controls the timing of gear shifts within the gearbox 124, as well as engagement or disengagement of the disconnect clutch 126 and the torque converter bypass clutch 134 Like the disconnect clutch 126, the torque converter bypass clutch 134 can be modulated across a range between the engaged and disengaged positions. This produces a variable slip in the torque converter 122 in addition to the variable slip produced by the hydrodynamic coupling between the impeller and the turbine. Alternatively, the torque converter bypass clutch 134 may be operated as locked or open without using a modulated operating mode depending on the particular application.

To drive the vehicle 110 with the engine 114, the disconnect clutch 126 is at least partially engaged to transfer at least a portion of the engine torque through the disconnect clutch 126 to the M/G 118, and then from the M/G 118 through the torque converter 122 and gearbox 124. The M/G 118 may assist the engine 114 by providing additional power to turn the shaft 130. This operation mode may be referred to as a "hybrid mode" or an "electric assist mode."

To drive the vehicle 110 with the M/G 118 as the sole power source, the power flow remains the same except the disconnect clutch 126 is operated to isolate the engine 114 from the remainder of the powertrain 112. Combustion in the engine 114 may be disabled or otherwise OFF during this time to conserve fuel. The traction battery 120 transmits stored electrical energy through a high-voltage (HV) bus 154 to a power electronics module 156 that may include an inverter, for example. The high-voltage bus 154 includes wiring and conductors for conducting current between modules and may include a positive-side conductor and a negative- or return-side conductor. The power electronics 156 convert DC voltage from the traction battery 120 into AC voltage to be used by the M/G 118. The controller 150 commands the power electronics 156 to convert voltage from the traction battery 120 to an AC voltage provided to the M/G 118 to provide positive or negative torque to the shaft 130. This operation mode may be referred to as an "electric only" operation mode.

In any mode of operation, the M/G 118 may act as a motor and provide a driving force for the powertrain 112. Alternatively, the M/G 118 may act as a generator and convert kinetic energy from the powertrain 112 into electric energy to be stored in the traction battery 120. The M/G 118 may act as a generator while the engine 114 is providing propulsion power for the vehicle 110, for example. The M/G 118 may additionally act as a generator during times of regenerative braking in which rotational energy from wheels 142, while rotating, is transferred back through the gearbox 124 and is converted into electrical energy for storage in the traction battery 120.

It should be understood that the schematic illustrated in FIG. 1 is merely exemplary and is not intended to be limiting. Other configurations are contemplated that utilize selective engagement of both an engine and a motor to transmit torque through the transmission. For example, the M/G 118 may be offset from the crankshaft 128, an additional motor may be provided to start the engine 114, and/or the M/G 118 may be provided between the torque converter 122 and the gearbox 124. Other configurations are contemplated without deviating from the scope of the present disclosure.

The vehicle 110 may utilize the M/G 118 to start the engine 114. The controller 150 may command the disconnect clutch 126 to close and request torque from the M/G 118 via the power electronics 156. The torque from the M/G 118 rotates the engine 114 so that the engine speed increases above a predetermined speed at which time the engine 114 may be commanded to provide fuel and spark to maintain continued engine rotation. The torque converter 122 may provide some torsional isolation during engine cranking and initial startup. In some vehicle configurations, a low-voltage starter motor 168 may also be coupled to the engine 114 to provide a secondary or backup means of starting the engine 114.

The controller 150 may control the operation of the gearbox 124. The controller 150 may facilitate shifting between gears of the gearbox. The controller 150 may coordinate operation of clutches within the gearbox 124 to achieve smooth gear transitions. The clutches may be hydraulically actuated and pressure may be controlled using solenoids that are electrically coupled to the controller 150. For example, to achieve a shift, pressure may be removed from a first clutch, while pressure is added to a second clutch. The first clutch may be referred to as the off-going clutch and the second clutch may be referred to as the on-coming clutch. During the shift, torque transfer through gearbox 124 may be transitioned from a first gear to a second gear by operation of the clutches.

The vehicle 110 may further include a power converter module 158 and an auxiliary battery 160. The auxiliary battery 160 may be a low-voltage battery such as a 12 Volt battery that is commonly used in automobiles. Terminals of the auxiliary battery 160 may be electrically coupled to a low-voltage bus 166. The low-voltage bus 166 includes wiring and conductors for conducting current between connected modules. The power converter 158 may be electrically coupled between the high-voltage bus 154 and the low-voltage bus 166. The power converter module 158 may be a DC/DC converter that is configured to convert voltage from the high-voltage bus 154 to a voltage level compatible with the low-voltage bus 166. The power converter 158 may be further configured to convert voltage from the low-voltage bus 166 to voltage compatible with the high-voltage bus 154. For example, the power converter 158 may be configured to provide a two-way flow of current between the high-voltage bus 154 and the low-voltage bus 166.

The M/G 118 may be a permanent magnet (PM) electric machine. A PM electric machine includes a rotor and a stator. The stator may include windings for producing a magnetic field to rotate the rotor. Current through the stator windings may be controlled to vary the magnetic field acting on the rotor. The rotor of a PM machine includes permanent magnets that create a magnetic field that interacts with the stator magnetic field to cause rotation of the rotor. The rotor speed may be controlled by the frequency of the magnetic field created by the stator. Since the rotor of the PM machine has magnets, rotating the rotor causes a magnetic field that interacts with the stator windings. The result is a voltage or back electromotive force (EMF) in the stator circuit. The magnitude of the back-EMF increases with the rotational speed of the rotor.

The M/G 118 may be a three-phase electric machine. The three-phase PM machine may include three phase terminals that are coupled to the stator windings. Each phase terminal is coupled to a different set of stator windings. By controlling the current and voltage applied to each of the terminals, the stator magnetic field may be controlled. The phases may be controlled so that a phase angle difference of the voltages between each of the phases is 120 degrees.

For controlling the M/G 118, a speed or position of the rotor or the M/G shaft 130 may be desired. An electric machine speed sensor 170 may be coupled to the M/G shaft 130 and configured to provide a signal indicative of the rotational speed and/or position of the M/G shaft 130. For example, the electric machine speed sensor 170 may be a resolver or encoder. An output signal of the electric machine speed sensor 170 may be coupled to the controller 150 and/or power electronics 156.

Other speed feedback sensors may be included in the powertrain system. An engine speed sensor 172 may be coupled to the crankshaft 128. For example, the engine speed sensor may be an encoder coupled the crankshaft 128 and/or the camshaft of the engine 114. The engine speed sensor 172 may provide a signal indicative of the rotational speed of the crankshaft to the controller 150.

One or more wheel speed sensors 174 may be included to provide a signal indicative of a rotational speed of the wheel 142. The wheel speed sensors 174 may be electrically coupled to the controller 150 and/or other controllers (e.g., braking controller). For example, the wheel speed sensor 174 may include a toothed wheel and a magnetic pickup. The wheel speeds may be used to generate a vehicle speed signal. The vehicle speed signal may be used for control of the powertrain and other vehicle functions. Although examples are provided for the speed/position sensing elements, the examples are not intended to limit the selection of the sensing element. The systems and methods described herein are applicable to other speed sensing elements.

In the example configuration, the electric machine speed sensor 170, the engine speed sensor 172, and the wheel speed sensors 174 are depicted as electrically coupled to the controller 150. In other configurations, the speed sensors may be electrically coupled to separate controllers. Speed sensor data and status may be communicated over a vehicle network (e.g., Controller Area Network (CAN), or other vehicle control network) to the controller 150.

The electric machine speed sensor 170, the engine speed sensor 172, and the wheel speed sensors 174 may be continually monitored to ensure proper operation. The controller 150 may monitor the sensors for proper electrical connection and check that voltage/current signals are within a predetermined acceptable range. The controller 150 may monitor the speed sensors to ensure that the signals are plausible. For example, the speed feedback values provided by the sensors may be monitored to ensure that the values taken together are indicative of a plausible operating condition. For example, the sensors may indicate speeds that should vary by a fixed gear ratio. The controller 150 may monitor the speed values to ensure that the values are within a predetermined range of one another. A speed sensor that is not functioning properly may be flagged with a diagnostic trouble code.

During vehicle operation, various speed values within the powertrain may be determined for use in controlling the powertrain. The electric machine speed sensor 170, the engine speed sensor 172, and the wheel speed sensors 174 may be used to determine the speeds of other components of the powertrain. A speed of the impeller of the torque converter 122 may be determined for control purposes. The impeller speed may be used for various computations within the powertrain control system. For example, a desired driver demanded torque may be a function of the impeller speed. The impeller speed may be further used for estimating the state of the torque converter and for operating the torque converter 122 in the open/slip state. The impeller speed may also be useful for speed control of the powertrain for creep and open torque converter tip-out. In addition, the impeller speed may be used for scheduling and adapting clutch shifts in the transmission. In the hybrid powertrain system, the impeller speed may be used to determine the state of the disconnect clutch 126.

In a conventional vehicle, the engine speed may be used in place of the impeller speed since the engine and impeller are directly connected. The engine speed may be redundantly determined based on a crank speed sensor and a cam shaft speed sensor. The dual sensors allow the impeller speed to be determined in the event one of the sensors becomes inoperative. In the hybrid powertrain, the impeller is coupled to the M/G shaft 130. As such, the impeller speed may be derived from the electric machine speed sensor 170. As there may be no redundant M/G speed sensor, the impellor speed may be indeterminable in the event that the electric machine speed sensor 170 becomes inoperative.

When there is a loss of signal or data from the electric machine speed sensor 170, alternative methods of computing the impeller speed may be desired. A loss of the electric machine speed sensor 170 may be caused by a number of issues. For example, wires that couple the electric machine speed sensor 170 to the controller 150 may become shorted or disconnected leading to a loss of signal. Other causes may include hardware issues with the controller 150 or in the circuitry that processes the signals from the electric machine speed sensor 170. As discussed, the controller 150 may monitor the health of the electric machine speed sensor 170 and flag conditions in which the sensor is inoperative. When the electric machine speed sensor 170 is inoperative, an alternate method for computing the impeller speed may be employed.

In a mode of operation in which the engine 114 and the electric machine 118 are both coupled to the torque converter 122, the engine speed sensor 172 may be used to determine the impeller speed. In this, mode, the disconnect clutch 126 is closed so that the engine 114 and the electric machine 118 are coupled. As the engine 118 and the M/G shaft 130 are rotating at a common speed, the impeller speed may be computed as:

$$\omega_{imp}^{est} = \omega_{eng} \qquad (1)$$

where $\omega_{eng}$ is the engine speed.

In a mode of operation in which the disconnect clutch 126 is opened, an alternate method of determining the impeller speed may be used. In this mode, the engine 114 and the M/G 118 are decoupled from one another. This mode may be referred to as an electric-only mode (EM-only) as only the M/G/118 is available to provide propulsion. The impeller speed estimate may be dependent upon the status of the torque converter. When the torque converter 122 is locked, the impeller speed may be estimated from the vehicle speed that may be derived from the wheel speed sensors 174. The torque converter 118 may be locked when the torque converter bypass clutch 134 is closed. When the torque converter 122 is closed, the M/G shaft 130 is coupled to the transmission output shaft 136 through a gear having a predetermined ratio. The impellor speed may be estimated as:

$$\omega_{imp}^{est} = \omega_{veh} * GR * FD \qquad (2)$$

where GR is the transmission gear ratio, FD is a final drive ratio of the differential 140, and $\omega_{veh}$ represent the vehicle speed reflected at the wheels.

When the torque converter bypass clutch 134 is opened, the impeller is not directly coupled to the transmission 124. In this case, the impeller speed is not directly a function of the vehicle speed or the transmission speed. Under this condition, a torque converter model may be defined to estimate the impeller speed. The torque converter 122 may be modeled by the following equations:

$$\tau_{imp} = \left(\frac{\omega_{imp}}{K}\right)^2 \qquad (3)$$

$$\tau_{tur} = \tau_{imp} * T_R \qquad (4)$$

$$SR = \frac{\omega_{tur}}{\omega_{imp}} \qquad (5)$$

where $\tau_{imp}$ is the torque at the impellor, $\tau_{tur}$ is the torque at the turbine, K is the capacity factor curve of the torque converter 122, TR is the torque ratio curve, and SR is a speed ratio. The capacity factor curve and the torque ratio curve may be function of the speed ratio. For coasting, the speed ratio is greater than one. The torque converter model may be further corrected for temperature and oil viscosity variations. The torque converter model parameters may be obtained by dynamometer testing of the torque converter.

Equations (3)-(5) may be manipulated to estimate the impeller speed. Multiplying and dividing equation (3) by the turbine speed yields:

$$\tau_{imp} = \left(\frac{\omega_{imp}}{K} * \frac{\omega_{tur}}{\omega_{tur}}\right)^2 = \left(\frac{\omega_{imp}}{\omega_{tur}}\right)^2 * \left(\frac{\omega_{tur}}{K}\right)^2 = \left(\frac{1}{SR}\right)^2 * \left(\frac{\omega_{tur}}{K}\right)^2 \qquad (6)$$

Upon further manipulation, the following equation results:

$$\frac{\tau_{imp}}{\omega_{tur}^2} = \left(\frac{1}{K*SR}\right)^2 \qquad (7)$$

The term $(K*SR)^{-2}$ is a function of the speed ratio and may be calculated offline for different values of SR. A one-to-one mapping function between SR and $(K*SR)^{-2}$ may be created and stored as a two-dimensional lookup table. During vehicle operation, given the impeller torque, $\tau_{imp}$, and the turbine speed, $\omega_{tur}$, the quantity $(K*SR)^{-2}$ may be computed as in equation (7). The speed ratio, SR, may be computed using the one-to-one mapping that was created. Knowing SR, the impeller speed can be computed as:

$$\omega_{imp}^{est} = \omega_{tur}/SR \qquad (8)$$

The impeller torque may be derived from the torque of the M/G 118. The torque of an electric machine may be computed accurately by the power electronics 156. For example, the torque of the M/G 118 may be computed based on the current provided to the M/G 118. The turbine speed may be computed based on the vehicle speed, $\omega_{veh}$ as derived from the wheel speed sensors 174. For example, equation (2) may represent the turbine speed based on the vehicle speed. In other configurations, a turbine speed sensor may be present.

Figure 2:
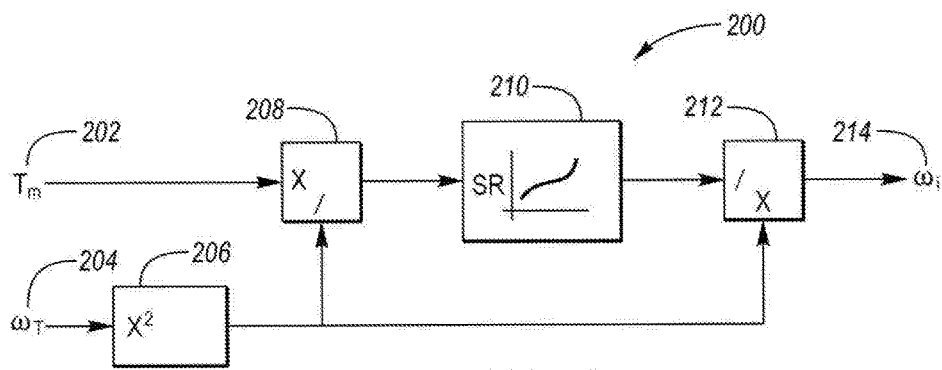
FIG. 2 is a block diagram for computing an impeller speed.

FIG. 2 is a block diagram 200 depicting the computations for determining the impeller speed when the disconnect clutch 126 and the torque converter bypass clutch 134 are open. A first input is the electric machine torque, $T_m$ 202. A second input is the turbine speed 204. The second input is routed through a squaring function 206. At a first division block 208, the electric machine torque 202 is divided by the square of the turbine speed 204. The output of the first division block is routed to a lookup function that implements a mapping function 210 between SR and $(K^*SR)^{-2}$. The output of the mapping function is the speed ratio, SR. At a second division block 212, the square of the turbine speed 204 is divided by the SR to yield an impeller speed output 214.

Figure 3:
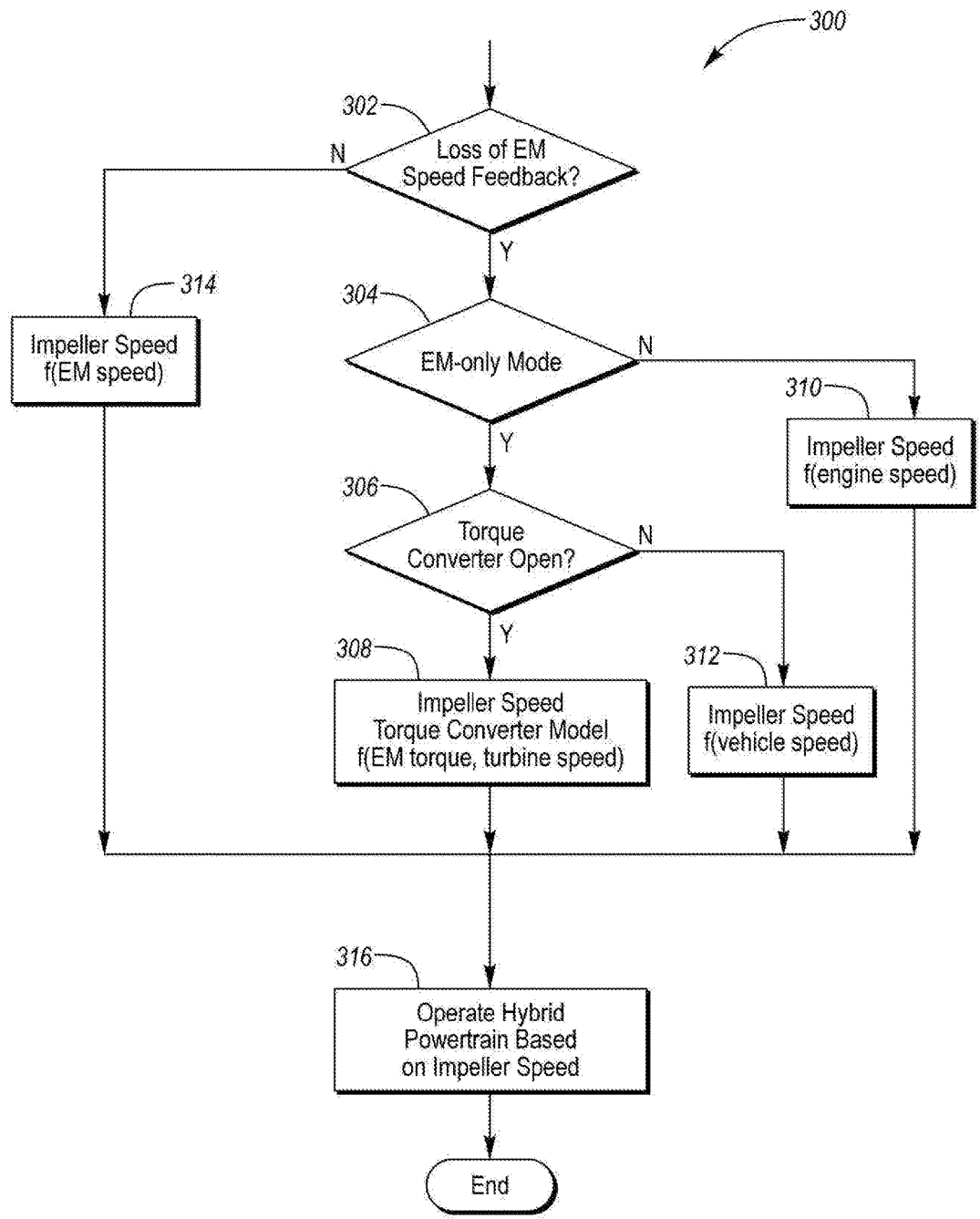
FIG. 3 is a flow chart for managing impeller speed determination.

FIG. 3 depicts a flowchart 300 of a sequence of operations that may be implemented in a controller (e.g., PCU 150). At operation 302, a check may be performed to determine if there is a loss of M/G speed feedback. The controller 150 may monitor diagnostic conditions and trouble codes to determine if the M/G speed feedback is available. If there a presence of the M/G speed feedback (e.g., no loss of speed feedback), operation 314 may be performed. At operation 314, the impeller speed may be computed based on the M/G speed as provided by the electric machine speed sensor 170. Operation 316 may then be performed to operate the hybrid powertrain based on the impeller speed. Operating the hybrid powertrain may include operating one or more of the engine 114, the electric machine 118, the torque converter 122, the gearbox 124, and the disconnect clutch 126. For example, operating the components may include controlling a torque and/or speed output of the associated component to a desired value. Operating the gearbox 124 may include shifting gears within the gearbox 124.

If a loss of M/G speed feedback is detected, operation 304 may be performed. At operation 304, a check may be performed to determine if the powertrain is in an electric-only operating mode. The powertrain may be in an electric-only operating mode when the disconnect clutch 126 is open. The controller 150 may monitor the status of the disconnect clutch 126 to determine the operating mode. If the powertrain is not in an electric-only operating mode, operation 310 may be performed. At operation 310, the impeller speed may be derived from the engine speed. Operation 316 may then be performed to operate the hybrid powertrain based on the impeller speed.

If the powertrain is in an electric-only operating mode, operation 306 may be performed. At operation 306, a check may be performed to determine if the torque converter 122 is open or closed. The controller 150 may monitor a status of the torque converter bypass clutch 134. If the torque converter bypass clutch 134 is closed, operation 312 may be performed. At operation 312, the impeller speed may be derived from the vehicle speed or wheel speed as described above. Operation 316 may then be performed to operate the hybrid powertrain based on the impeller speed.

If the torque converter bypass clutch 134 is open, operation 308 may be performed. At operation 308, the impeller speed may be derived using the torque converter model described above. The impeller speed may be a function of the M/G torque and the turbine speed. For example, the block diagram of FIG. 2 may be implemented as part of the operation. Operation 316 may then be performed to operate the hybrid powertrain based on the impeller speed.

At operation 316, the powertrain may be operated based on the impeller speed. For example, a desired driver demanded torque may be computed based on the impeller speed. The controller 150 may implement a creep speed control loop that is based on the impeller speed. In addition, scheduling of shifting clutches in the transmission 124 may be based on the impeller speed.

The system presented provides alternative methods for determining the impeller speed. The system is robust against a loss of electric machine speed feedback which would normally lead to a degradation in performance. By utilizing a torque converter model in the electric-only operating mode when the torque converter bypass clutch is opened, operation may be maintained with little or no performance degradation.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A hybrid powertrain comprising: a torque converter coupled to an electric machine and a gearbox and selectively coupled to an engine; and a controller programmed to, responsive to a loss of electric machine speed feedback while the engine is decoupled and the torque converter is open, shift the gearbox based on an estimate of an impeller speed of the torque converter, the estimate derived from a torque of the electric machine and a turbine speed of the torque converter.

2. The hybrid powertrain of claim 1 wherein the controller is further programmed to, responsive to a presence of electric machine speed feedback, shift the gearbox based on the estimate of the impeller speed, the estimate derived from the electric machine speed feedback.

3. The hybrid powertrain of claim 1 wherein the controller is further programmed to, responsive to the loss of electric machine speed feedback while the engine is decoupled and the torque converter is locked, operate the electric machine and the gearbox based on the estimate of the impeller speed, the estimate derived from a wheel speed.

4. The hybrid powertrain of claim 1 wherein the controller is further programmed to, responsive to the loss of electric machine speed feedback while the engine is coupled, operate the engine, electric machine, and gearbox based on the estimate of the impeller speed, the estimate derived from a speed of the engine.

5. The hybrid powertrain of claim 1 wherein the turbine speed is derived from a vehicle speed associated with the gearbox.

6. The hybrid powertrain of claim 1 wherein the controller is further programmed to estimate a state of the torque converter based on the estimate of the impeller speed.

7. The hybrid powertrain of claim 1 wherein the controller is further programmed to operate the electric machine to control vehicle speed based on the estimate of the impeller speed.

8. A vehicle comprising: a torque converter coupled to an electric machine and selectively coupled to an engine; and a controller programmed to operate the electric machine based on an estimate of a torque converter impeller speed and change, responsive to the engine being decoupled and a loss of electric machine speed feedback, the estimate from being based on electric machine speed feedback to being based on an electric machine torque and a vehicle speed.

9. The vehicle of claim 8 wherein the vehicle further includes a gearbox coupled to an output of the torque converter and the controller is further programmed to operate the gearbox to shift gears based on the estimate of the torque converter impeller speed.

10. The vehicle of claim 8 wherein the controller is further programmed to, responsive to the loss of electric machine speed feedback while the engine is decoupled and the torque converter is locked, operate the engine and the electric machine based on the estimate of the torque converter impeller speed, the estimate being derived from a wheel speed.

11. The vehicle of claim 8 wherein the controller is further programmed to, responsive to the loss of electric machine speed feedback while the engine is coupled, operate the engine and the electric machine based on the estimate of the torque converter impeller speed, the estimate being derived from the speed of the engine.

12. The vehicle of claim 8 wherein the speed of the vehicle is derived from at least one wheel speed of the vehicle.

13. The vehicle of claim 8 wherein the controller is further programmed to estimate a state of the torque converter based on the impeller speed.

14. The vehicle of claim 8 wherein the controller is further programmed to operate the engine and the electric machine to control a creep speed of the vehicle based on the estimate of the torque converter impeller speed.

15. A method comprising: shifting a gearbox, coupled to an output of a torque converter that is further coupled to an electric machine and selectively coupled to an engine, based on an estimate of an impeller speed of the torque converter, the estimate derived from a torque of the electric machine and a turbine speed of the torque converter responsive to the engine being disconnected from the torque converter and a loss of electric machine speed feedback.

16. The method of claim 15 further comprising shifting the gearbox based on the estimate of the impeller speed derived from the electric machine speed feedback responsive to a presence of the electric machine speed feedback.

17. The method of claim 15 further comprising operating the engine, electric machine and gearbox to control a speed output of the gearbox based on the estimate of the impeller speed.

18. The method of claim 15 further comprising operating the engine, electric machine and gearbox based on the estimate of the impeller speed, the estimate derived from a speed of the engine responsive to the loss of electric machine speed feedback while the engine is coupled.

19. The method of claim 15 further comprising operating the engine, electric machine and gearbox based on the estimate of the impeller speed, the estimate derived from a wheel speed responsive to the loss of electric machine speed feedback while the engine is decoupled and the torque converter is locked.

20. The method of claim 15 wherein the turbine speed is derived from a vehicle speed.

* * * * *